US007580805B2

(12) United States Patent
Tabaian et al.

(10) Patent No.: US 7,580,805 B2
(45) Date of Patent: Aug. 25, 2009

(54) PROGRAMMABLE CALIBRATION CIRCUIT FOR POWER SUPPLY CURRENT SENSING AND DROOP LOSS COMPENSATION

(75) Inventors: Fereydun Tabaian, Newport Coast, CA (US); Hamed Sadati, Dubai (AE); Ali Hejazi, Dubai (AE); Ahmad Ashrafzadeh, Sunnyvale, CA (US)

(73) Assignee: Nupower Semiconductor, Inc., Newport Coast, CA (US)

( * ) Notice: Subject to any disclaimer, the term of this patent is extended or adjusted under 35 U.S.C. 154(b) by 0 days.

(21) Appl. No.: 12/132,325

(22) Filed: Jun. 3, 2008
(Under 37 CFR 1.47)

(65) Prior Publication Data
US 2008/0231342 A1 Sep. 25, 2008

Related U.S. Application Data

(60) Continuation of application No. 11/349,826, filed on Feb. 8, 2006, now Pat. No. 7,383,145, and a division of application No. 10/878,477, filed on Jun. 29, 2004, now Pat. No. 7,027,944.

(60) Provisional application No. 60/484,105, filed on Jun. 30, 2003.

(51) Int. Cl.
*G01R 35/00* (2006.01)

(52) U.S. Cl. .......... 702/106; 702/64; 323/257; 323/255; 323/260; 323/239; 323/258; 323/283; 323/285

(58) Field of Classification Search ............ 702/64, 702/106; 330/2; 323/257, 255, 260, 239, 323/258, 283, 285, 282, 315, 284, 266, 222, 323/288, 300, 314; 327/218, 156, 158; 322/20–28, 322/72, 73
See application file for complete search history.

(56) References Cited

U.S. PATENT DOCUMENTS 4,746,879 A 5/1988 Ma et al.
(Continued)

FOREIGN PATENT DOCUMENTS

JP 07-065864 3/1995
(Continued)

OTHER PUBLICATIONS http://www.eetimes.com/show/pressure-lease.html?Articleid=98169, Sep. 10, 2003.
(Continued)

*Primary Examiner*—Carol S Tsai
(74) *Attorney, Agent, or Firm*—Seyed Kaveh E. Rashidi-Yazd, Esq.; Troutman Sanders LLP

(57) ABSTRACT

A circuit for regulating power is disclosed. The present invention provides circuits and methods for current sensing variations, static droop settings, mismatched phase outputs, and temperature variations in a multiphase power regulator. The circuits may include a calibration controller that senses and regulates both a current sensing circuit and the droop in a power regulator over a range of temperatures thus equalizing phase outputs. The present invention includes the schematic organization and implementation of the circuit, the circuit's calibration, its use, and implementation. This invention advantageously provides circuits and methods to properly power a processor or IC chip according to the unique power specifications of the processor or chip.

17 Claims, 2 Drawing Sheets

U.S. PATENT DOCUMENTS

| | | | |
|---|---|---|---|
| 5,294,879 A * | 3/1994 | Freeman et al. ............... 322/23 |
| 5,825,164 A * | 10/1998 | Williams .................... 323/255 |
| 5,993,060 A * | 11/1999 | Sakurai ..................... 374/178 |
| 6,184,670 B1 * | 2/2001 | Mulatti et al. ............... 323/314 |
| 6,246,220 B1 | 6/2001 | Isham et al. |
| 6,486,641 B2 * | 11/2002 | Scoggins et al. ............ 323/257 |
| 6,498,461 B1 | 12/2002 | Bucur |
| 6,504,395 B1 * | 1/2003 | Johnson ..................... 324/765 |
| 6,528,976 B1 * | 3/2003 | Lenk et al. .................. 323/282 |
| 6,611,129 B2 | 8/2003 | Bucur |
| 6,664,771 B2 * | 12/2003 | Scoggins et al. ............ 323/257 |
| 6,677,736 B1 * | 1/2004 | Barnes et al. ............... 323/280 |
| 6,680,604 B2 * | 1/2004 | Muratov et al. ............ 323/285 |
| 6,882,238 B2 * | 4/2005 | Kurd et al. .................. 331/186 |
| 6,906,975 B2 * | 6/2005 | Kang et al. ................. 365/211 |
| 7,027,944 B2 | 4/2006 | Tabaian et al. |
| 7,383,145 B2 | 6/2008 | Tabaian et al. |
| 2001/0045815 A1 * | 11/2001 | Muratov et al. ............ 323/280 |
| 2002/0125871 A1 * | 9/2002 | Groom et al. ............... 323/284 |
| 2002/0171985 A1 * | 11/2002 | Duffy et al. .................... 361/90 |
| 2003/0006650 A1 * | 1/2003 | Tang et al. ..................... 307/43 |
| 2004/0062058 A1 * | 4/2004 | Hann et al. .................... 363/15 |
| 2004/0183613 A1 * | 9/2004 | Kurd et al. ................... 331/186 |
| 2004/0219891 A1 * | 11/2004 | Hadjichristos ............. 455/102 |

FOREIGN PATENT DOCUMENTS

WO    WO2005/006101    1/2005

OTHER PUBLICATIONS

PCT Application PCT/US04/20663 International Search Report mailed Nov. 18, 2005.

PCT Application PCT/US04/20663 Written Opinion of the International Search Authority mailed Nov. 18, 2005.

PCT Application PCT/US04/20663 Notification of Transmittal of International Preliminary Report on Patentability dated Apr. 5, 2006.

* cited by examiner

PROGRAMMABLE CALIBRATION CIRCUIT FOR POWER SUPPLY CURRENT SENSING AND DROOP LOSS COMPENSATION

CROSS-REFERENCE TO RELATED APPLICATIONS

This application claims the benefit, under 35 U.S.C. §119, of U.S. provisional Application Ser. No. 60/484,105, filed 30 Jun. 2003, the entire contents and substance of which is hereby incorporated by reference.

BACKGROUND OF THE INVENTION

Multi-phase voltage regulators are commonly used over single-phase regulators because they produce higher current output, faster transient responses, and more efficient applications in microprocessor power supplies. Due to discrete components and power device mismatches, the load current is not always equally shared among all the phases of multi-phase regulators causing inadequate operation and excessive heat in the power devices of one or more phases of a multi-phase power supply. To overcome this problem, active current sharing may be utilized to force current equalization among all phases. This requires a current sensing circuit. Since sense resistors are both inefficient and expensive, other resistive elements such as RDSon of the power MOSFETs, DCR of the inductor, and board traces are used to measure the source current for each phase of the power supply. These elements have a high degree of variation from one to another over changing environmental conditions and over production lot variations. Historically, using these elements to sense current causes a mismatch in the current between the phases. Currently there are no reasonable solutions to this mismatch.

The droop function is used in a power supply to automatically lower the output voltage based on the output current. This provides more headroom in the case of load transients, and also removes the number of required output capacitors, thus lowering costs while still meeting the required voltage tolerances. The droop is set by the manufacturer of a processor and is based on a function of the regulator output current. Thus, the droop function accuracy is directly related to the current sensing accuracy.

There are many ways to set the droop based on the measured current. For instance, one may limit the DC gain of the error amplifier in the current mode power supply, lower the reference by a ratio related to the overall current, increase the feedback based on the ratio of the overall current, or lower the error based on the ratio of overall current. All these topologies require accurate current sensing and accurate ratio settings at which the load current adjusts the output voltage. Historically, setting the droop accurately has also been a major problem due to inadequacies in current sensing and processor batch variations.

Presently, the droop setting is fixed, thus once the system has been built, the droop rate cannot be changed without overly costly retrofits. Today, variations in processor power requirements vary from processor to processor, even those manufactured by the same manufacturer within the same batch. Because the droop setting is fixed, the power supply is unable to adapt to the processors power needs. Therefore, processors with power specifications beyond what the power supply can produce are wasted. This processor waste is very inefficient and costly.

Another phenomenon affecting current sensing circuit is temperature. Most elements used in current sensing have positive temperature coefficients; the resistance of the circuit increases as the temperature increases. This variation results in erroneous measurements of the current over temperature variations causing further droop inaccuracies.

The present invention provides a cost effective and automated solution to this and other shortcomings of current devices, systems, and methods.

SUMMARY OF THE INVENTION

One embodiment of the present invention may be a circuit comprising a regulator circuit and a calibration control circuit. The calibration control circuit includes a controller, an interface with nonvolatile memory, droop outputs, sense outputs, load voltage input, and temperature input. The calibration control circuit interfaces with the regulator circuit via the sense outputs, the droop outputs, and the load voltage input. The calibration control circuit interfaces with the temperature input to receive temperature data. The temperature data may be used by the calibration control circuit to adjust the sense outputs and the droop outputs. The calibration control circuit also interfaces with the temperature input and the load voltage input to calibrate the calibration data which may be stored in nonvolatile memory.

In another embodiment of the present invention the regulator circuit may be a voltage mode regulator, a current mode regulator, a buck regulator, V-square, hysteretics, or any other power regulator.

In another embodiment of the present invention the regulator circuit may be a multiphase regulator with any number of phases from one to infinity. The controller has at least one sense output for each phase of the multiphase regulator.

In another embodiment of the present invention the calibration control circuit adjusts the sense outputs and the droop outputs according to data stored in the nonvolatile memory.

In another embodiment of the present invention the nonvolatile memory stores regulator performance parameters and application specific power curve data. The nonvolatile memory may be either monolithic on non monolithic. The data stored in the nonvolatile memory for the droop outputs and sense outputs may be based on the load voltage input and the temperature input. In one embodiment the regulator circuit calibration data may be stored in a lookup table within the nonvolatile memory.

In another embodiment of the present invention the droop outputs and the sense outputs include a digital to analog converter with registered input and an amplifier buffer.

In another embodiment of the present invention the load voltage input may include a digital to analog converter with registered output. The temperature input may also include an analog to digital converter with registered output with both an amplifier and a temperature sensor. The temperature sensor may be internal or external to the circuit and may be an RTD, thermister, or a thermocouple.

In another embodiment of the invention the load may include such processors as the Intel Pentium® series processors, the Intel Centrino® series processors, the Intel Express® series processors, the Intel Xenon® series processors, the Intel Celeron® series processors, the AMD Athlon® series processors, the AMD Duron® series processors, the AMD K6® series processors, the AMD Opteron® series processors, or the Power PC Sonnet® series processors.

In another embodiment of the present invention the calibration control circuit may include a temperature output with a digital to analog converter with registered input and an amplifier buffer. This amplifier may be an adjustable amplifier that may be adjusted via the controller's temperature output.

In another embodiment of the present invention the calibration control circuit may include an external interface to an external controller. This processor may monitor the load voltage input, and the temperature input. The processor may also control the sense outputs, the droop output, read data from the nonvolatile memory, and write to the nonvolatile memory. This process may be a computer, a state machine, or any other controller.

In another embodiment of the present invention the calibration control circuit includes an error output. This output may include a digital to analog converter with registered input and an amplifier buffer. This output may interface with the regulator's error circuit In another embodiment of the present invention the regulator circuit includes a multiphase clock register, multiple phases, an adjustable droop amplifier, and an error circuit with an error amplifier. Each phase of the regulator may be powered by a phase of the multiphase clock generator and includes a set register, gate driver, output FETs, a current sense circuit, an adjustable sense amplifier, and a pulse width moderator. This multiphase clock register may have N phases, where N is an integer from 1 to infinity. Likewise the regulator may have N phases. A phase of the multiphase clock generator drives the set input of said set register. The set register drives the gate driver and the output FETs. These output FETs drive the load of the circuit. The current sense circuit measures the current of the output FETs and feeds back to the register via the adjustable sense amplifier and the pulse width modulator. The adjustable sense amplifier also feeds into the adjustable droop amplifier. The droop amplifier drives the error circuit. The error circuit drives each pulse width modulator on each phase.

In another embodiment of the present invention the multiphase regulator includes an interface to an external controller.

In another embodiment of the present invention the calibration control circuit interfaces with the multiphase regulator by adjusting the sense amplifiers in each phase via the sense outputs. The calibration control circuit may also adjust the droop amplifier via the droop output. Further, the calibration control circuit may monitor the load voltage output of the current sense circuit via the load voltage input.

In another embodiment of the present invention the current sense circuit may be a RDSon of a power MOSFETs DCR of an inductor, sense series resistor, or a board trace.

In another embodiment of the present invention the adjustable droop amplifier may be adjusted to compensate for regulator circuit variations. The sense amplifier may likewise be adjusted to compensate for regulator circuit variations.

The present invention also embodies the methods of calibrating a calibration control circuit connected with a regulator supplying power to a load. This method begins with estimating the anticipated operation specifications of circuit's load. Output data may then be created based on this estimate and stored in nonvolatile memory. Both the regulator and the calibration control circuit may be placed in a circuit with a load. The load voltage input and temperature input of the calibration control circuit may be sampled. The sense outputs and the droop output may be adjusted until the input load voltage meets load operation specifications. The controller then creates data that relates the temperature with the sense outputs and temperature with the droop output and store the data in nonvolatile memory. In this embodiment any number of steps may be omitted or performed in any beneficial order. This process is repeated over a range of anticipated operating temperatures, across each phase, and with various anticipated loads. This method may also be monitored and controlled by an external controller and measurement equipment. The external controller may create the output data and write it to the external memory.

In another embodiment of the present invention the calibration control circuit and the regulator may be included in one circuit: the control regulator. In order to minimize waste due to production variations in chip manufacture, this control regulator may be used to power a chip. The control regulator may be selected from a plurality of control regulators and the load may be a chip which also may be selected from a plurality of chips. The two may be placed in the same circuit such that the chip may be the load of the control regulator and the calibration allows each control regulator to power each chip according to the chip's unique power requirements. These chips may be processors, RAM, controllers, microprocessors, or any other chip whose power specifications vary with manufacture or temperature. This embodiment reduces chip waste by allowing the chip manufacturer to use chips with a broader range of operating specs because the control regulator may be calibrated to account for the matched chips unique power requirements.

In another embodiment of the present invention a calibration control circuit may be implemented in a circuit with a regulator by first sampling temperature data from temperature input. The controller then references the memory for stored calibration data that may be associated with the sampled temperature. Finally the controller sets the sense output and the droop output of the calibration control circuit according to the calibrated data. These steps may be continuously repeated at set intervals of time and across each phase.

DETAILED DESCRIPTION OF THE INVENTION

Figure 1:
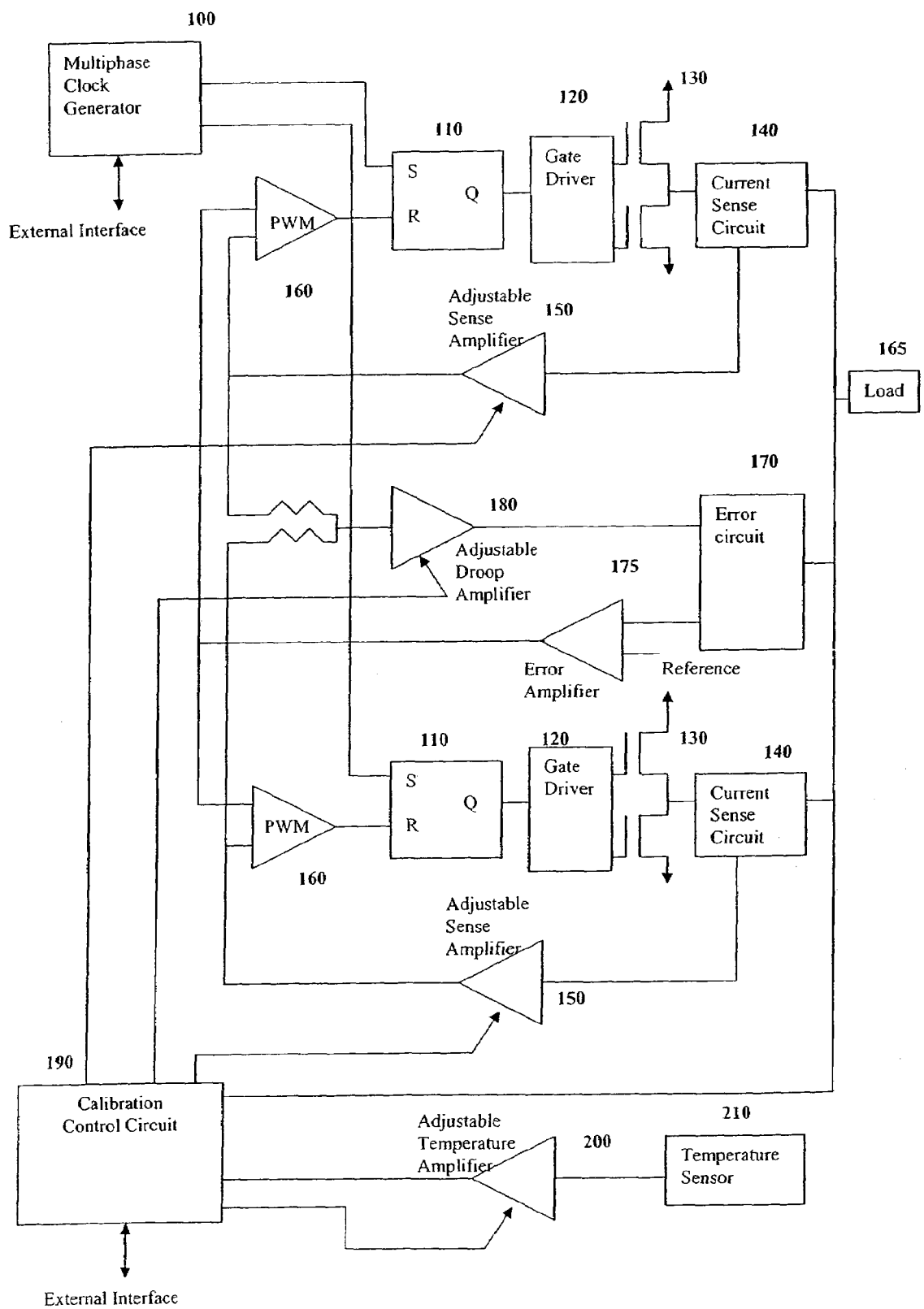
FIG. 1 is a schematic of one embodiment of the present invention showing two phases of a multiphase regulator with a calibration control circuit.

It is to be understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. All references cited herein are incorporated by reference herein in their entirety.

This invention is a new and innovative active current sharing application that can result in near perfect current match across phases of a multiphase regulator. This invention also provides accurate temperature-independent droop settings that can be programmed for specific and changing applications in the field. The disclosed circuit is digitally calibrated to compensate for the inaccuracies of the current sensing elements. This calibration data is preferably stored in nonvolatile memory, where it can be reused, modified, and restored throughout the life of the power supply. Thus, at power up, the current sensing mechanism is adjusted by the calibration parameters such that the overall gain of the sensing mechanism in all phases may be matched, and the total current across all phases is shared equally regardless of the temperature or the load.

This invention provides near equivalent power to a load across all phases of a multiphase power supply. By calibrating the droop and sense settings over various temperatures for a specific load the power supply compensates for inaccuracies in the circuit. This calibration data may be storied in nonvolatile memory. Providing such equivalent power across phases enhances load performance. This calibration also provides the power supply with the necessary settings to meet the unique specifications of the load. This load may be any type of circuit. Typically the load may be an integrated processor, memory, or any other integrated circuit. Such processors may include the Intel Pentium® series processors, the Intel Centrino® series processors, the Intel Express® series processors, the Intel Xenon® series processors, the Intel Celeron® series processors, the AMD Athlon® series processors, the AMD Duron® series processors, the AMD K6® series processors, the AMD Opteron® series processors, or the Power PC Sonnet® series processors. The load may also be any type of memory, flash, integrated circuit, or any complete system application This invention may further power a circuit that requires near constant and consistent power over time, variations in temperature, and across phases.

This invention also provides methods of using the calibration circuits of the present invention. The regulator may be placed in a circuit in such away that it powers a load. This load may be any type of circuit requiring application specific power. Through an external interface connected to a programmed processor or state machine, the regulator may be calibrated to meet the specific load requirements of the load. The load voltage and the temperature may be monitored while the droop and sense settings may be adjusted until the load voltage meets the load's specification. Data may be created corresponding to the temperature and the droop and sense settings. This data may then be stored in memory. The process may be repeated over an anticipated temperature range. This process may be performed during the testing and calibration phase of the entire circuit. Providing such consistency across the phases of the regulator and allowing the regulator to meet load specific specifications allows a circuit manufacturer to use loads with a greater range of power needs. Thus, the number of loads that may be wasted because the regulator is unable to meet their needs is minimized. Further, load performance is enhanced because the calibration circuit provides settings based on temperature variations.

The present invention also may include a circuit comprising a regulator circuit and a calibration control circuit. The calibration control circuit may include a controller, an interface with nonvolatile memory, droop outputs, sense outputs, load voltage input, and a temperature input. The calibration control circuit interfaces with the regulator circuit via the sense outputs, the droop outputs, and the load voltage input. The calibration control circuit interfaces with said temperature input to receive temperature data. The temperature data may be used by the calibration control circuit to adjust the sense outputs and the droop outputs. The calibration control circuit also interfaces with the temperature input and the load voltage input to calibrate the calibration data which may be stored in nonvolatile memory.

The regulator circuits of this invention may include a voltage mode regulator, a current mode regulator, a buck regulator, V-square, hysteretics, or any other power regulator. The regulator circuit may also be a multiphase regulator with any number of phases from one to infinity. The controller preferably has at least one sense output for each phase of a multiphase regulator.

The calibration control circuits of this invention may adjust the sense outputs and the droop outputs according to data stored in the nonvolatile memory.

The nonvolatile memory of the present invention may store regulator performance parameters and application specific power curve data. The nonvolatile memory may be either monolithic on non monolithic. The data stored in the nonvolatile memory for the droop outputs and the outputs may be based on the load voltage input and the temperature input. In one embodiment the regulator circuit calibration data may be stored in a lookup table within the nonvolatile memory.

The outputs of the present invention may include a digital to analog converter with registered input and an amplifier buffer, while the inputs may include a digital to analog converter with registered output. The temperature input may further include an amplifier and a temperature sensor. The temperature sensor may be internal or external to the circuit and may be an RTD, thermister, or a thermocouple.

The calibration control circuits of the present invention may include a temperature output. This output may include a digital to analog converter with registered input and an amplifier buffer. This amplifier may be an adjustable amplifier that may be adjusted via the controller's temperature output.

The circuits of the present invention may include an external interface to an external controller. This processor may monitor the load voltage input, and the temperature input. The processor may also control the sense outputs, the droop output, read data from the nonvolatile memory, and write to the nonvolatile memory. This processor may be a computer, a state machine, or any other controller.

The calibration control circuits may include an error output. This output may include a digital to analog converter with registered input and an amplifier buffer. This output may interface with the regulator's error circuit The regulator circuits may include a multiphase clock register, multiple phases, an adjustable droop amplifier, and an error circuit with an error amplifier. Each phase of the regulator may be powered by a single phase of the multiphase clock generator and includes a set register, gate driver, output FETs, a current sense circuit, an adjustable sense amplifier, and a pulse width moderator. This multiphase clock register may have N phases, where N is an integer from 1 to infinity. Likewise the regulator may have N phases. A phase of the multiphase clock generator may drive the set input of said set register. The set register drives the gate drive and the output FETs. These output FETs drive the load of the circuit. The current sense circuit measures the current of the output FETs and feeds back to the register via the adjustable sense amplifier and the pulse width modulator. The adjustable sense amplifier also feeds into the adjustable droop amplifier. The droop amplifier drives the error circuit. The error circuit drives each pulse width modulator on each phase. The multiphase regulator may include an interface to an external controller.

The calibration control circuits of the present invention may interface with the multiphase regulator by adjusting the sense amplifiers in each phase via the sense outputs. The calibration control circuit may also adjust the droop amplifier via the droop output. Further, the calibration control circuit may monitor the load voltage output of the current sense circuit via the load voltage input. The calibration control circuit may adjust the error amplifier.

The current sense circuit may include the RDSon of a power MOSFETs DCR of an inductor, sense series resistor, or a board trace.

The adjustable droop amplifier may be adjusted to compensate for regulator circuit variations. The sense amplifier may likewise be adjusted to compensate for regulator circuit variations.

This invention includes methods of calibrating a calibration control circuit connected with a regulator supplying power to a load. These methods may begin with estimating the anticipated operation specifications of circuit's load, creating a set of output data based on this estimate, and taking the output data and storing it in nonvolatile memory. Both the regulator and the calibration control circuit may be placed in a circuit with a load. The methods of the present invention may then sample the load voltage input at the interface between the regulator and the load and sample the temperature input of the calibration control circuit. The sense outputs and the droop output then may be adjusted until the input load voltage meets load operation specifications. The controller then may create data that relates the temperature with the sense outputs and temperature with the droop output and store the data in nonvolatile memory. In the methods of the present invention any number of steps may be omitted or performed in any beneficial order. The methods may be repeated over a range of anticipated operating temperatures, across each phase, and with various anticipated loads. The methods also may be monitored and controlled by an external controller and measurement equipment. The external controller may create the output data and write it to the nonvolatile memory.

The calibration control circuit and the regulator may be included in one circuit: the control regulator. In order to minimize waste due to production variations in chip manufacture, this control regulator may be used to power a chip. The control regulator may be selected from a plurality of control regulators and the load may be a chip which also may be selected from a plurality of chips. The two may be placed in the same circuit such that the chip may be the load of the control regulator and the calibration allows each control regulator to power each chip according to the chip's unique power requirements. These chips may be processors, RAM, controllers, microprocessors, or any other chip whose power specifications vary with manufacture or temperature. This embodiment reduces chip waste by allowing the chip manufacturer to use chips with a broader range of operating specs because the control regulator may be calibrated to account for the matched chips unique power requirements. In yet another application of the present invention the load may be any complete system application consisting of multiple components.

The load of the invention may include such processors as the Intel Pentium® series processors, the Intel Centrino® series processors, the Intel Express® series processors, the Intel Xenon® series processors, the Intel Celeron® series processors, the AMD Athlon® series processors, the AMD Duron® series processors, the AMD K6® series processors, the AMD Opteron® series processors, the PowerPC Sonnet® series processors, or any integrated circuit processor may also be included. The load may also be any type of memory, flash, integrated circuit, or any complete system application.

The calibration control circuit may be implemented in a circuit with a regulator by first sampling temperature data from temperature input. The controller then references the memory for stored calibration data that may be associated with the sampled temperature. Finally the controller may set the sense output and the droop output of the calibration control circuit according to the calibrated data. These steps may be continuously repeated at set intervals of time, repeated across each phase, and in any beneficial and practical order.

Referring to the figures, FIG. 1 is a schematic of one embodiment of the present invention showing two phases of a multiphase regulator connected with a calibration control circuit 190. This multiphase regulator may be a multiphase regulator of any number of phases from one to infinity. A multiphase clock generator 100 on each phase drives the set input of the phase control set register 110. This register in turn drives gate driver 120 and the output FET 130 to generate the source power for the specific phase output.

A current sense circuit 140 may be placed between the output FET 130 and the load 165. This current sense circuit may be implemented by measuring the current across the sense resistors, an RDS on the output FET driver, the current across the inductor of a DCR circuit, or the current across the resistance of a board trace. No matter the implementation of the current sense circuit, the current sense circuit feeds back to the regulator circuit through the adjustable sense amplifier 150 and a pulse width modulator 160. The adjustable sense amplifier may be adjusted via the calibration control circuit 190. The adjustable sense amplifier 150 controls the variances in the current sensing circuit. By adjusting the feedback gain of the adjustable sense amplifier 150, variations in the current sense circuit of each phase can be balanced to equalize the load seen by each phase of a multi-phase regulator.

The output of the adjustable sense amplifier 150 drives the current sense input of the pulse width modulator (PWM) 160 to generate the proper pulse width signal to the power output FET 130 to regulate the output power. The adjustable sense amplifier 150 also drives the shared summing input port to the adjustable droop amplifier 180. This adjustable droop amplifier 180 may be used to adjust the droop loss across the current sense circuit 140. The adjustment of the droop amplifier 180 may be used to drive an error circuit. The adjusted voltage driver circuit may be compared against the reference voltage at the error amplifier 175 to generate the error voltage value for the pulse width modulators 160. Adjusting the droop amplifier 180 may be equivalent to adjusting the reference voltage. The load voltage 165 may be monitored via the calibration control circuit 190.

The output of the error amplifier 175 drives one port of each pulse width modulator 160 to compensate for the droop loss. The output of an individual pulse width modulator 160 drives its associated phase control set register 110 to control the output drive FET 130.

The current sense circuit 140 also varies over operating. In one embodiment of the present invention a temperature sensor 210, in line with an adjustable temperature amplifier 200, and interfacing with the calibration control circuit 190 may be used to monitor the variations in the operating temperature. This temperature sensor may be internal or external to either the regulator circuit or the calibration control circuit 190. The data received from the temperature sensor 210 may be used to adjust the droop amplifier 180 and the sense amplifiers 150 to regulate the output power over variations in temperature.

Figure 2:
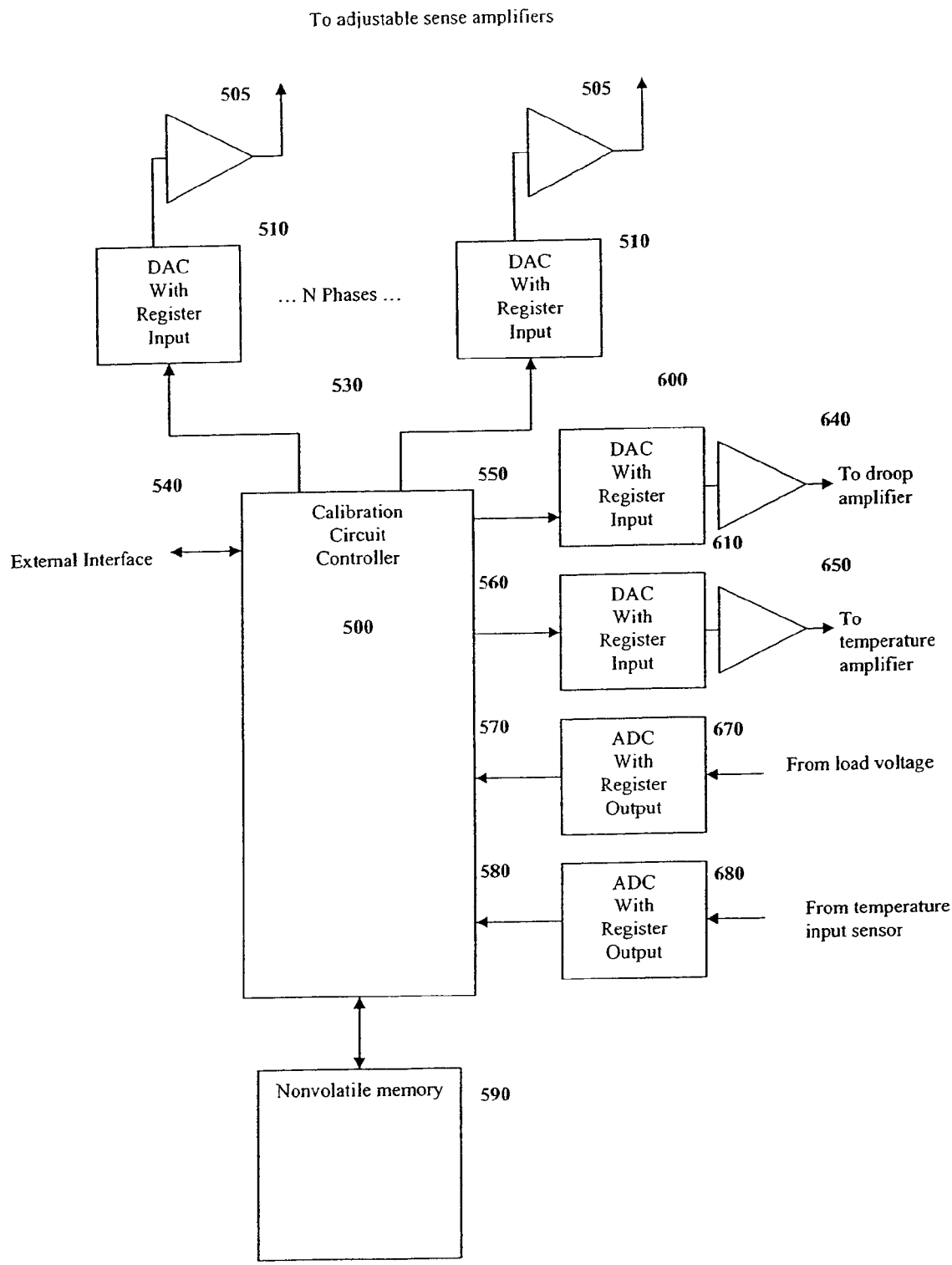
FIG. 2 is a schematic of one embodiment of the present invention showing the calibration control circuit.

The calibration control circuit 190 in FIG. 1 is shown in more detail in FIG. 2. FIG. 2 shows one embodiment of the calibration control circuit. The calibration control circuit controls the adjustments to the droop amplifier via the droop output 550 and the sense amplifiers via sense outputs 530. The main component of the calibration control circuit is the controller 500. The controller 500 may be a state machine, a processor or any other logic device.

The controller 500 adjusts the sense amplifiers of the regulator circuit via sense outputs 530. The controller 500 has an output for each phase of a multiphase regulator. These sense outputs 530 in one embodiment interface with the adjustable sense amplifiers via a digital to analog converter with registered input 510, and an amplifier 505. Likewise the droop output 550 from the controller 500 in one embodiment interfaces with the adjustable droop amplifier via a digital to analog converter with registered input 600 and an amplifier 640. Further, the temperature output 560 from the controller 500 in one embodiment interfaces with the adjustable temperature amplifier via a digital to analog converter with registered input 610 and an amplifier 650.

The controller samples load voltage input 570 from the regulator circuit in one embodiment via an analog to digital converter with registered output 670. Likewise, the controller samples temperature input 580 from the temperature sensor in one embodiment via an analog to digital converter with registered output 680.

The controller 500 interfaces with nonvolatile memory 590 that holds temperature dependent settings of the droop output and sense outputs. This nonvolatile memory 590 may be located on the calibration control circuit or may be located elsewhere. The controller 500 also interfaces with an external controller that may control the adjustments directly, read the status values of the sample inputs for temperature and load voltage, and to read and write the nonvolatile memory contents.

It will be apparent to those skilled in the art that various modifications and variations can be made in the circuits or methods of the present invention without departing from the scope and spirit of the invention. Other embodiments of the invention will be apparent to those skilled in the art from consideration of the specification and practice of the invention disclosed herein. It is intended that the specification and examples be considered as exemplary only of the present invention.

What is claimed is:

1. A method of calibrating a calibration control circuit connected with a regulator supplying power to a load, comprising the steps of: estimating anticipated operation specifications of said load; creating a set of output data based on said estimate; storing said output data in nonvolatile memory; placing said regulator and said calibration control circuit in a circuit with said load; sampling calibration control circuit inputs from load voltage input at the interface between said regulator; sampling calibration control circuit temperature input; adjusting sense outputs of said calibration control circuit until input load voltage meets load operation specifications; adjusting droop output of said calibration control circuit until input load voltage meets load operation specifications; creating output data that relates temperature input with sense outputs and temperature data with droop output; and storing the created output in nonvolatile memory; wherein one or more said steps may be performed in any appropriate order.

2. The method of claim 1 wherein the regulator is a multiphase regulator.

3. The method of claim 1 wherein the method is repeated at different operating temperatures.

4. The method of claim 1 wherein said nonvolatile memory is either monolithic or non monolithic.

5. The method of claim 1 wherein said output data is stored in a look up table.

6. The method of claim 1 wherein the method is repeated with different loads.

7. The method of claim 1 wherein said method is controlled and monitored via an external interface.

8. The method of claim 1 where the calibration control circuit and the regulator are part of the same circuit.

9. The method of claim 1 wherein said load voltage is measured with external measurement equipment, said output data is created externally, and said output data is transferred to said calibration control circuit.

10. The method of claim 1 wherein said calibration control circuit is controlled by an external controller that is selected from the set consisting of a processor, a computer, and a state machine.

11. The method of claim 1 wherein the regulator is a multiphase regulator and the method is repeated for each phases of said multiphase regulator.

12. The method of claim 1 wherein the method is repeated at different operating temperatures.

13. The method of claim 1 wherein the method is repeated with different loads.

14. The method of claim 1 wherein said calibration control circuit and said regulator are included in one control regulator.

15. The method of claim 14 wherein said control regulator is selected from a plurality of control regulator and said load is a chip selected from a plurality of chips, such that said chip is said load of said control regulator, wherein said calibration allows each control regulator to power each chip according to said chip's unique power requirements.

16. The method of claim 15 wherein said chips are selected from the group consisting of processors, RAM, controllers, and processors.

17. The method of claim 15 wherein said control regulator is selected from the group consisting of a single phase regulator, a two phase regulator, multiphase regulator, and an N phase regulator, where N can be any integer number from 1 to infinity.

\* \* \* \* \*